United States Patent Office 3,154,481
Patented Oct. 27, 1964

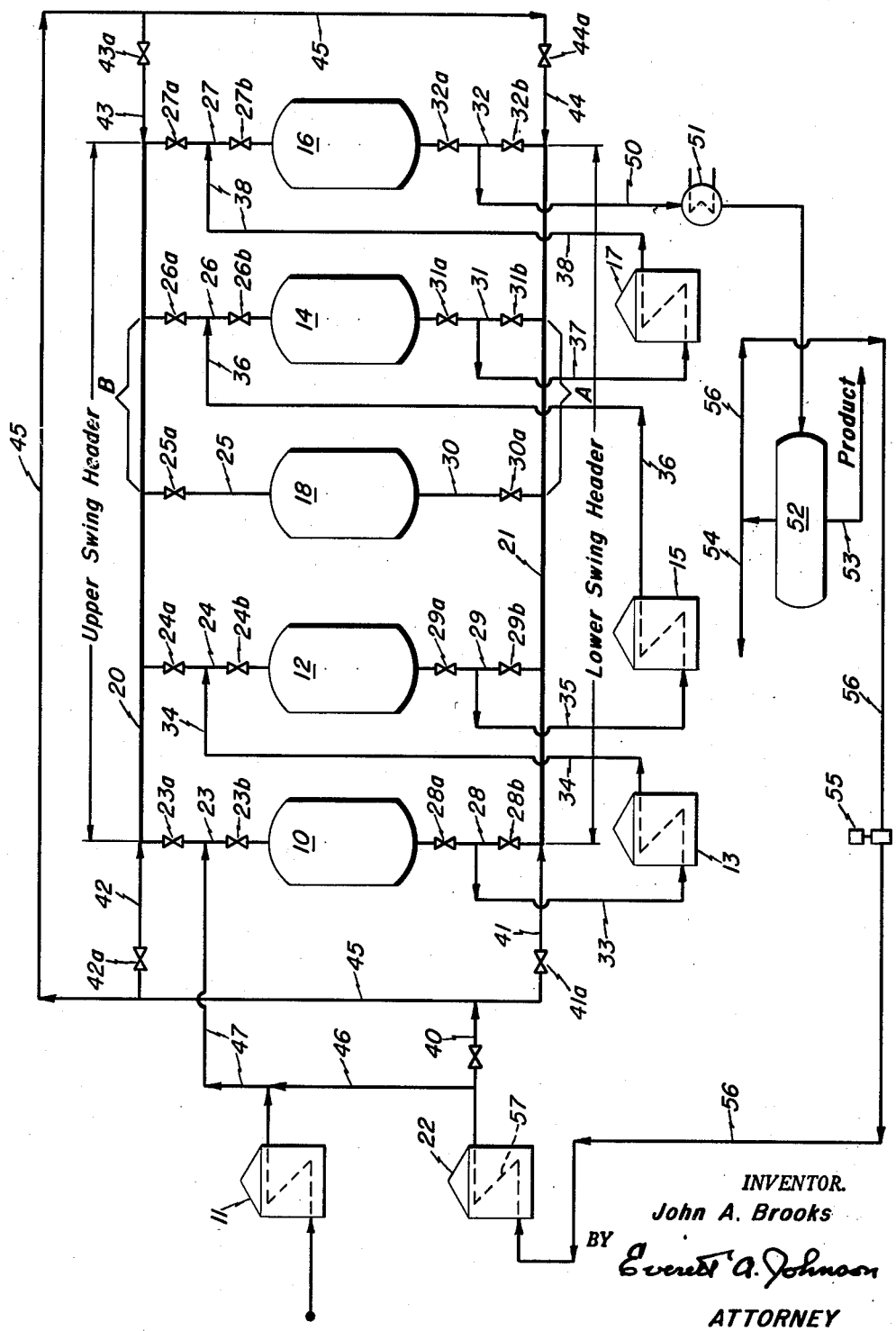

3,154,481
REGENERATIVE REFORMING PROCESS
John A. Brooks, Chicago, Ill., assignor to Standard Oil Company, Chicago, Ill., a corporation of Indiana
Filed Aug. 31, 1961, Ser. No. 135,356
2 Claims. (Cl. 208—65)

This invention relates to an improved regenerative platinum-on-alumina hydrocarbon conversion system for reforming naphtha.

Supported platinum catalysts, e.g., platinum-on-alumina catalyst, are used extensively in a conversion of hydrocarbons, particularly in the hydroforming of petroleum naphthas to increase the octane numbers thereof. In a typical reforming system, a mixture of petroleum naphtha and hydrogen-containing gas is passed through a bed of platinum-alumina catalyst containing between about 0.05 and 1 percent by weight of platinum, at a temperature in the range of about 850 to 1050° F., elevated pressure, i.e., a pressure between about 50 and 1000 pounds per square inch, a hydrogen rate in the range of about 1,000 to 10,000 standard cubic feet per barrel of charging stock, and an hourly weight space velocity between about 0.5 and 10. Under such conditions the catalytic properties of platinum catalyst gradually decline over a period of time as a result of carbon deposits and/or other physical and chemical changes in the platinum and/or supporting materials.

In order to realize the maximum benefit with a reformer of this type, frequent regeneration of individual reactors is required. The reactors are on-stream for a relatively long time period of twenty-four to forty-eight hours or more and do not necessarily undergo regeneration in any particular sequence. The regeneration cycle normally requires an inert gas purging operation followed by carbon burn-off with a dilute oxygen containing gas, e.g., about 2 percent oxygen, to prevent undue temperature rise at a relatively moderate temperature in the range of about 700° to 900° F. for a period of time sufficient to restore the catalyst to the original activity level or higher.

In my system I provide multiple reactors and will describe it by reference to five reactors of which at least four are primary or on-stream reactors and one is an alternate or swing reactor. The system further includes a charging stock heater and three re-heaters, connecting lines and valves for passing charging stock through the charging stock heater, a first on-stream reactor, the first re-heater, a second on-stream reactor, the second re-heater, a third on-stream reactor, the third re-heater, and a fourth on-stream reactor, while the alternate or "swing" reactor is undergoing regeneration.

In a process of this type the final reactor may be alternately on-stream and regenerated for several cycles before it is necessary to cut out the preceding on-stream reactor for regeneration and a prior on-stream reactor may require even less frequent regeneration than the following on-stream reactor. In a typical situation with five reactors, the sequences of regenerations on the reactors may be fourth, third, swing; fourth, third, second, swing; fourth, third, swing; fourth, third, second, first, swing; etc.

The reactant flow through the system is always in series: first reactor, first re-heater, second reactor, second re-heater, third reactor, etc. The swing or alternate reactor, after itself has been regenerated, merely takes the place of one of the on-stream reactors when the other reactor is off-stream for regeneration.

An arrangement of connecting process piping and valves referred to as upper and lower swing headers are provided for substituting the alternate reactor for any one of the on-stream reactors when one of the latter requires regeneration. Commercial experience indicates the need to keep the swing headers warm and should be at a temperature which is within about 300° F. of process temperatures. It is desirable to keep the headers hot so as to avoid thermal shock to and failure of these lines.

Heretofore the swing headers have been heated by bypassing a portion of the hot reformer feed through the headers. In doing so, the bypassed portion of the feed does not pass through all the reforming reactors but does appear in the reformate product and there is a resulting loss in octane. Such loss in octane has been found to amount to at least 0.5 O.N. and as much as 0.6 to 0.9 O.N. on the total reformate. Expressed in terms of gasoline yields, if it is desired to achieve 96 octane then a major portion of the feed must be reformed to 97 octane because of the bypassing of the low octane charging material to heat the headers; and about 1% in gasoline yield is lost because of the higher severity.

In view of such octane penalties, bypassing the feed to warm the swing headers is uneconomical and undesirable. It is with respect to this problem that this invention relates.

In accordance with my invention, the temperature of the connecting piping (commonly called swing headers) is controlled by use of separately heated recycle gas, thus eliminating the bypass use of the total reactor charge and increasing the octane number of the reformate.

The accompanying drawing, which forms a part of this specification, is a simplified process flow diagram embodying means whereby the swing reactor headers are heated by diverting a portion of separately heated recycle gas.

Referring to the drawing, five reactors, 10, 12, 14, 16, and 18, are provided, of which at least four are on-stream and one (18) is an alternate or swing reactor. An arrangement of connecting lines and valves is provided for use with swing headers 20 and 21 for substituting the alternate reactor 18 for any one of the on-stream reactors 10, 12, 14, and 16, when any of the latter requires regeneration.

The unit also includes a charging stock heater 11 and three re-heaters, 13, 15, and 17, and separate recycle gas furnace 22, together with the necessary connecting lines and valves (to be further identified and described below) for passing charging stock through the on-stream reactors 10, 12, 16, and 18, in the illustrated embodiment.

The reactant flow through the system is always in the series: first reactor 10, first re-heater 13, second reactor 12, second re-heater 15, third reactor 14, etc. The alternate reactor 18 merely takes the place of one of the on-stream reactors when this is necessary or desirable. In the drawing, the system is illustrated wherein third reactor 14 is undergoing regeneration.

The upper swing header 20 is connected to reactors 10, 12, 18, 14, and 16, by means of valved lines 23, 24, 25, 26, and 27, containing the indicated valves. The lower swing header 21 is connected to reactors 10, 12, 18, 14, and 16, by valved lines 28, 29, 30, 31, and 32. The re-heaters 13, 15, and 17 are respectively provided with inlet line 33, transfer line 34, inlet line 35, transfer line 36, inlet line 37, and transfer line 38.

Warm-up facilities for the swing headers 20 and 21, including valved recycle gas diversion line 40, a first valved warm-up line 41, a second valved warm-up line 42, a third valved warm-up line 43, and a fourth valved warm-up line 44, such warm-up lines 41, 42, 43, and 44, discharging into opposite ends of the upper and lower swing headers 20 and 21 and being supplied with heated recycle gas by manifold line 45.

Typically, the gas diversion line 40 and the manifold line 45, may be about 2" I.D. with the warm-up lines 41, 42, and 43, being about 1" I.D., whereas the primary recycled gas line 46, and the naphtha feed line 47, as well as the swing headers 20 and 21, are from 10 to 12" in diameter.

Although two or more of the reactors are always connected for series flow operation, the alternate reactor 18, may be connected for parallel operation with a selected one of the reactors in such series. The connection for parallel operation is advantageous since the alternate reactor 18 may actually be operated in parallel with any selected reactor 10, 12, 14, or 16, in the series at such times that none of the reactors require regeneration. Systems of this type are described for example in U.S. 2,773,014 and 2,853,436, and will not be described in more detail here.

The diverted recycle gas flows through the warm-up lines 41 and 42 and the warm-up lines 43 and 44, with the recycle gas flowing through the header 20 from line 42 until it joins the flow of process fluids passing through valved line 25; and through the lower swing header 21 from line 41 until it joins the flow of process fluids in section A.

Further, warm-up and benefit is obtained by flowing another portion of the warm-up gas from manifold 45 through line 43 into the upper header 20, where it comingles with the flow of process fluids in section B; and another portion of warm-up fluids introduced by line 44 passes through a portion of the lower header 21, and is co-mingled with the process fluids emerging from section A of the header.

In each instance, the co-mingled process fluids and warm-up gases continue through the system without in any way detracting from octane number or gasoline yields.

For the arrangement shown in the drawings, the naphtha plus recycle hydrogen feed is passed in series through the on-stream reactors bypassing reactor 14 which is undergoing regeneration. Valves 23a and 28a, 24a and 29a, 26b and 31b, and 27a and 32a, are closed. The other valves in the lines communicating with the reactors and headers remain open. Valves 41a, 42a, 43a, and 44a, in the warm-up lines 41 to 44, respectively, are adjusted to provide the desired flow into the headers.

The naphtha-hydrogen feed in line 47 is processed by passing through valve 23b, reactor 10, valve 28b, inlet line 33, reheat furnace 13, transfer line 34, valve 24b, reactor 12, valve 29b, inlet line 35, second re-heater 15, transfer line 36, valve 26a, a section B of upper swing header 20, valved line 25, reactor 18, valved line 30a, a section of the lower swing header 21, valve 31a, inlet line 37, third re-heater 17, transfer line 38, valve 27b, and tail reactor 16.

The effluent from the tail reactor 16, at a temperature of at least about 900° F., is withdrawn through line 50 and heat exchanger 51 to separator 52 wherein hydrogen is separated from condensed hydrocarbons at a temperature not substantially higher than 100° F. The condensed hydrocarbons are withdrawn through line 53 to any known type of product recovery system (not shown). The net hydrogen produced is withdrawn through line 54, usually to a suitable absorber for recovering hydrocarbons therefrom.

The remainder of the hydrogen is recycled by compressor 55, through recycle line 56, to the furnace 22 wherein it is separately heated in coil 57. The major portion of a heated hydrogen is passed by line 46 and co-mingled with naphtha feed in line 47; a minor portion (about 2% of the total recycle gas) is introduced into the warm-up manifold 45 by diversion line 40.

Although the invention has been described by reference to certain embodiments thereof, this has been by way of illustration only, and it is contemplated that modifications may be made therein by those skilled in the art without departing from the spirit of the invention.

What I claim is:

1. The method of maintaining temperature in swing headers associated with a regenerative platinum catalyst naphtha hydroforming system which includes lead, intermediate, tail, and swing reaction zones, charge heating zones, a gas separation zone, and lines for recycling gas from said separation zone, which method comprises introducing pre-heated naphtha charge into on-stream reaction zones together with a portion of separated recycle gas, effecting regeneration of an off-stream reaction zone, bypassing portions of said swing headers in conducting naphtha charge to the other of said on-stream reaction zones, diverting a portion of separately heated recycle gas through said bypassed portions of said headers whereby the swing headers are maintained at elevated temperature during regeneration of said off-stream reaction zone, and passing said diverted recycle gas from said bypassed header portion into said process stream whereby the total naphtha vapor charge is passed through the on-stream reaction zones and all of said charge is subjected to reforming conditions maintained therein.

2. The method of claim 1 wherein the diverted recycle gas maintains the bypassed header portions at an elevated temperature within about 300° F. of the process temperature.

References Cited in the file of this patent

UNITED STATES PATENTS

| | | |
|---|---|---|
| 2,880,161 | Moore et al. | Mar. 31, 1959 |
| 2,895,898 | Brooks et al. | July 21, 1959 |
| 2,908,653 | Hengstebeck | Oct. 13, 1959 |
| 2,914,465 | Hengstebeck | Nov. 24, 1959 |
| 2,923,679 | Thomson | Feb. 2, 1960 |